(12) United States Patent
Johnson

(10) Patent No.: US 9,481,203 B2
(45) Date of Patent: Nov. 1, 2016

(54) HUB-LESS VEHICLE WHEEL HAVING A SOLID SPOKE-LESS RIM AND MULTILAYERED TIRE

(71) Applicant: Jonathan David Johnson, Marina, CA (US)

(72) Inventor: Jonathan David Johnson, Marina, CA (US)

(73) Assignee: Jonathan Johnson, Seaside, CA (US)

( * ) Notice: Subject to any disclaimer, the term of this patent is extended or adjusted under 35 U.S.C. 154(b) by 115 days.

(21) Appl. No.: 14/226,839

(22) Filed: Mar. 27, 2014

(65) Prior Publication Data
US 2015/0273937 A1    Oct. 1, 2015

(51) Int. Cl.
*B60B 19/00*    (2006.01)

(52) U.S. Cl.
CPC ............ *B60B 19/00* (2013.01); *B60B 2360/50* (2013.01); *B60B 2900/111* (2013.01); *B60B 2900/112* (2013.01)

(58) Field of Classification Search
CPC ....... B60B 3/048; B60B 19/00; B60B 21/10; B60C 7/102
USPC ..................................................... 301/6.1, 6.5
See application file for complete search history.

(56) References Cited

U.S. PATENT DOCUMENTS

| | | | | |
|---|---|---|---|---|
| 2,843,426 | A * | 7/1958 | Nojima | B60B 3/048 16/24 |
| 3,022,810 | A * | 2/1962 | Lambe | B60C 7/105 152/157 |
| 2007/0209855 | A1* | 9/2007 | Burkiewicz | B60B 3/048 180/223 |

\* cited by examiner

*Primary Examiner* — John Walters
*Assistant Examiner* — James Triggs

(57) ABSTRACT

The invention disclosed herein is a hub-less vehicle wheel consisting of a rolling brace (14) inside a spoke-less wheel rim (12) and a two-layered solid tire (10). The outer layer of the solid tire (11) being design for contact with a vehicle road and for protecting the softer inner layer (19) with both Layers being firmly attached to the rim (12). The rolling brace (14) being designed as a support structure that attaches to a standard vehicle suspension while also negating any arbitrary forces to the tire (10).

5 Claims, 4 Drawing Sheets

HUB-LESS VEHICLE WHEEL HAVING A SOLID SPOKE-LESS RIM AND MULTILAYERED TIRE

BACKGROUND OF THE INVENTION

Historically the earliest wheel was believed to be little more than a circular solid piece of wood with a hole in the center. The centered hole was the hub for the wheel to rotate around. This design worked as a means to carry several objects at a time, but it was very heavy, requiring large animals to effectively move the objects at a tedious pace.

The first major improvement to the wheel was the use of spokes. This was such a grand improvement that it in turn brought forth the first major vehicle, the chariot. Spokes were a basic support structure that met the minimum requirements to withstand the multiple forces that a wheel sustains. A pair of spokes used the minimum three points of contact to constitute a rigid frame. This rigid frame formed the shape of a triangle that could be traced by going from the hub to two spoke mounting points on the wheel rim and back again. Several of those triangles would extend from the hub in all directions to support the whole circumference of the wheel rim and they created a visibly repetitive pattern. Although the number and size of the spokes used for wheels have changed over the years, they still serve the same purpose.

The next improvement was the tire. This hoop of metal or rubber was used to protect the wheel rim from harsh road conditions, allowing for a longer wheel life.

Then the pneumatic tire was introduced to help soften the damages caused by the road. The pneumatic tire, being little more than a rubber balloon, was able to absorb road vibration, lighten tire weight, and give the wheel a larger contact surface. Unfortunately, like a balloon, the pneumatic tire could be popped. Nylon and steel belts were eventually added to the tire to strengthen the rubber and give it a more consistent shape. However, this did not eliminate air leaks or any of the other flaws associated with the pneumatic tire.

More recently there have been attempts to reduce the air loss of a pneumatic tire by filling it with various materials, but these attempts have also fallen victim to the various flaws associated with either the heavy unforgiving solid tires or the delicate pneumatic tires of the past.

BRIEF SUMMARY OF THE INVENTION

The design and operation of the modern wheel gives rise to certain limitations. These limitations include weight, size, material, manufacturing process, airflow, recycling, resistance to foreign objects, resistance to imperfections, pressure, temperature and puncture.

It is an object of the present invention to overcome these shortcomings by providing an improved vehicle wheel that is compatible with existing suspensions, affordable, and easy to use while still addressing the aforementioned limitations associated with other wheel designs.

Accordingly, the preferred embodiment of the present invention achieves the objective of significant weight reduction by replacing a wheel hub and spoke system with a rolling brace that can easily be directly connected to a suspension. Furthermore, since the brace creates a rigid frame, it can handle the road conditions that would damage an annular support system as well as support the weight of larger wheel sizes.

Other objects and advantages are achieved by using a soft inner rubber layer, instead of air, giving it the stability and stiffness of a solid tire with the pliability and rolling resistance of a pneumatic.

Any additional objects, advantages, and novel features of the invention will become apparent upon examination of the following specification, or will be learned through the practice of the present invention.

DETAILED DESCRIPTION OF THE INVENTION

The present invention can best be understood by associating descriptions to possible applications; hence, this description will refer to the attached drawings in detail.

Figure 1:
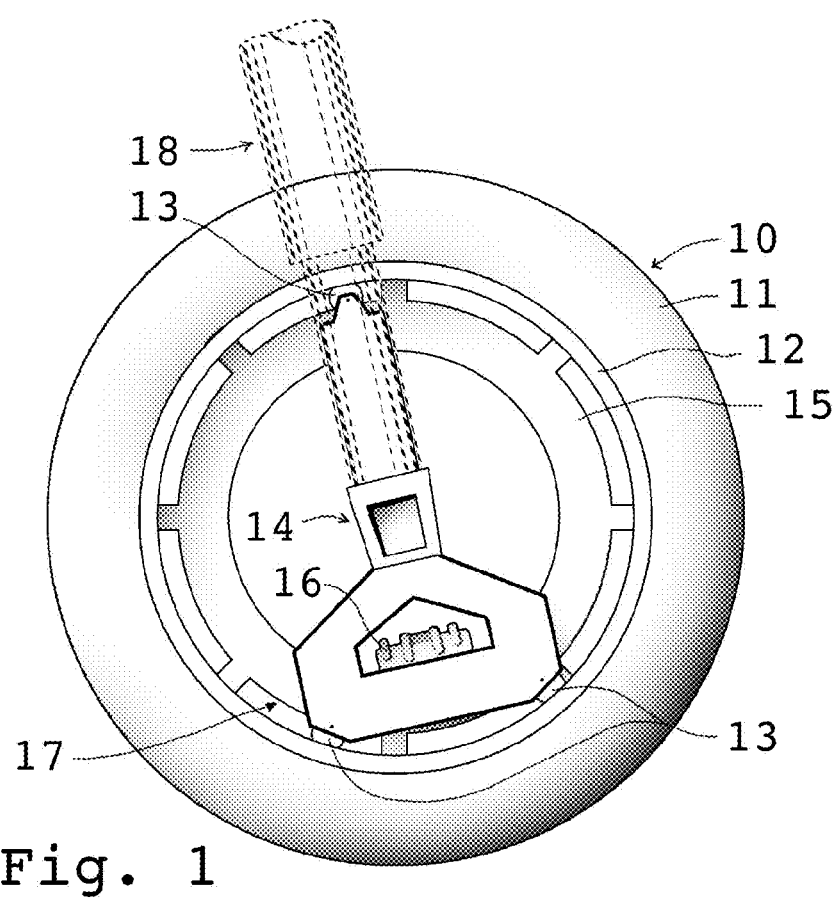
FIG. 1 is a side view of the preferred embodiment of the present invention showing it visibly connected to a suspension.

FIG. 1 shows a side view for the preferred embodiment of the present invention as it would most commonly be used. The treaded and round solid rubber layer (11) of the tire (10) is bonded to the cylindrical rim base (12). A simple support structure in the form of a brace (14) uses appropriately placed rollers (13) to hold the rim (12) in a relative position while allowing it to freely rotate in a forward or reverse direction. A common hydraulic braking mechanism (17) consisting of a floating brake caliper (16) mounted in the middle of the brace (14) and a rotor (15) affixed to the inside of the rim (12) provide the traditional braking functionality. The brace (14) also has protruding shapes upon which the shocks (18) of the vehicle are directly mounted.

Figure 2:
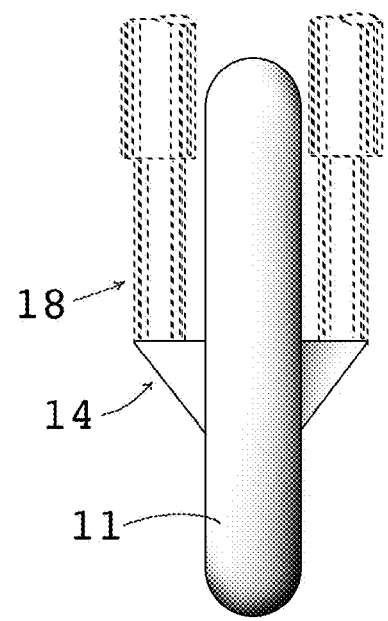
FIG. 2 is a front view of the preferred embodiment of the present invention with it visibly connected to a suspension.

FIG. 2 is the front view of the preferred embodiment of the present invention showing the shape of the outer layer of the tire (11) and the protruding mounts of the brace (14) for the suspension shocks (18).

Figure 3:
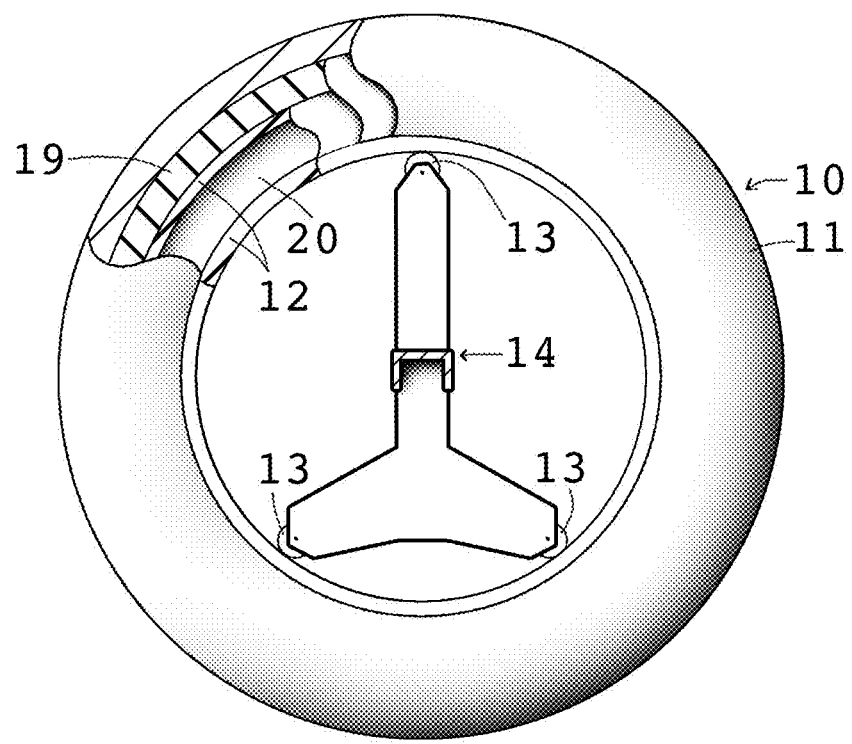
FIG. 3 is a side view of the present invention showing a cut-away of the tire and rim layers; also, it includes a simplified brace (14) mounted to an arbitrary vehicle.

FIG. 3 shows an alternate side view of the invention with a section of the visible tire (10) and rim (12) cut away. It also shows the less visible rollers (13) and a simplified center brace (14) for use on multi-wheeled vehicles like trailers or carts where a simplified, light, and freely rotating wheel would be most advantageous.

Figure 4:
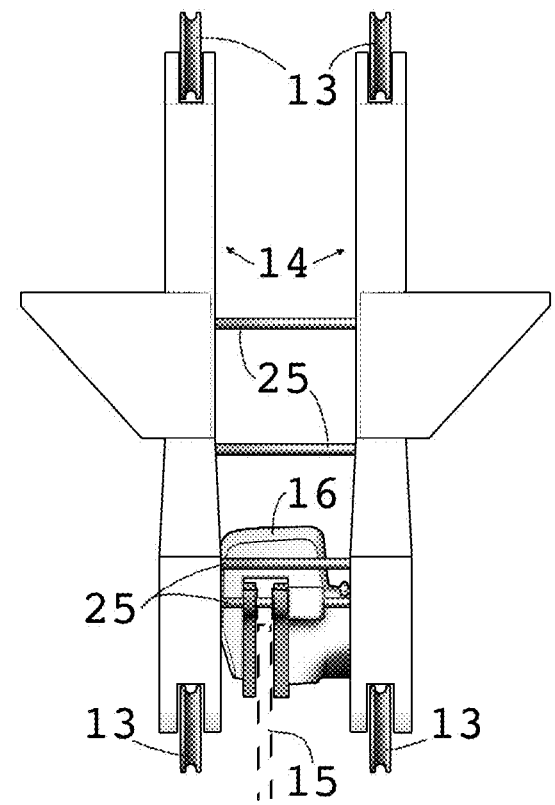
FIG. 4 shows a frontal view of the brace (14) used in FIG. 1.

FIG. 4 is an unobscured frontal view of the brace (14) used in FIG. 1. It shows the connecting links (25) used to support the caliper (16) and to space the mirrored sides of the brace (14) keeping them rigid, and thus preventing derailment from the rim. Furthermore, the links (25) allow the caliper (16) to freely slide and clamp onto the rotor (15) while transferring the braking force to the brace (14). A relative position for the interaction of the caliper and the rotor (15) is also referenced.

Figure 5:
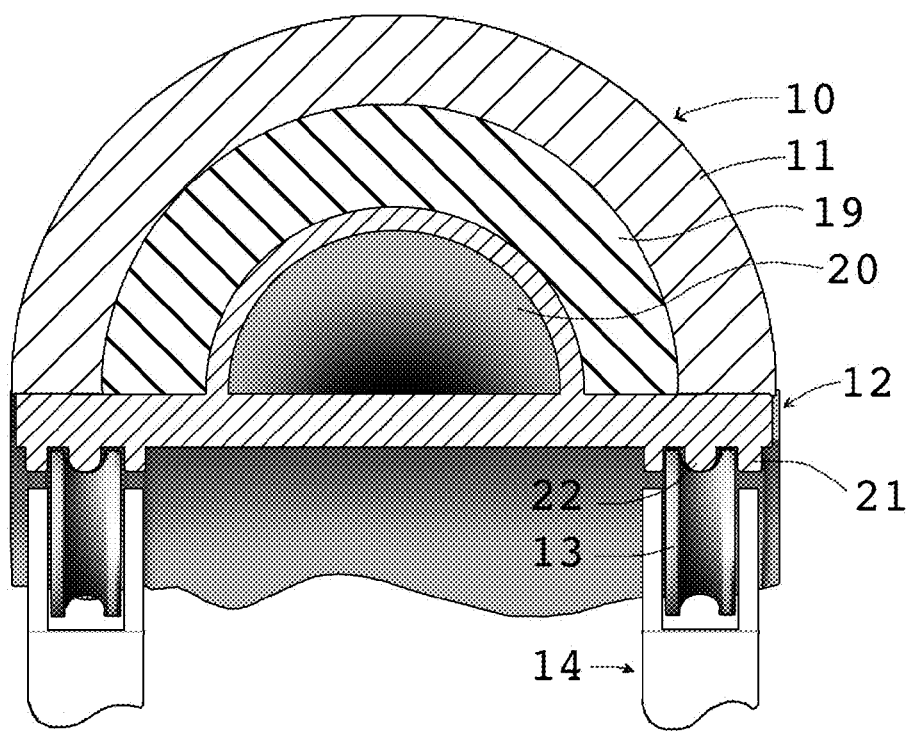
FIG. 5 shows an embodiment of the tire (10) and rim (12) in a radial section.

FIG. 5 is a view of an enlarged radial section of the tire (10) from FIG. 3 displaying the outer tire layer (11), the softer lower layer (19), and part of the cylindrical rim (12) with a truncated cylindrical cavity or tunnel (20). It also displays the basic rail (22), rail guard (21), and roller (13) system used to rotate the wheel. Part of the brace (14) is shown for reference.

Figure 6:
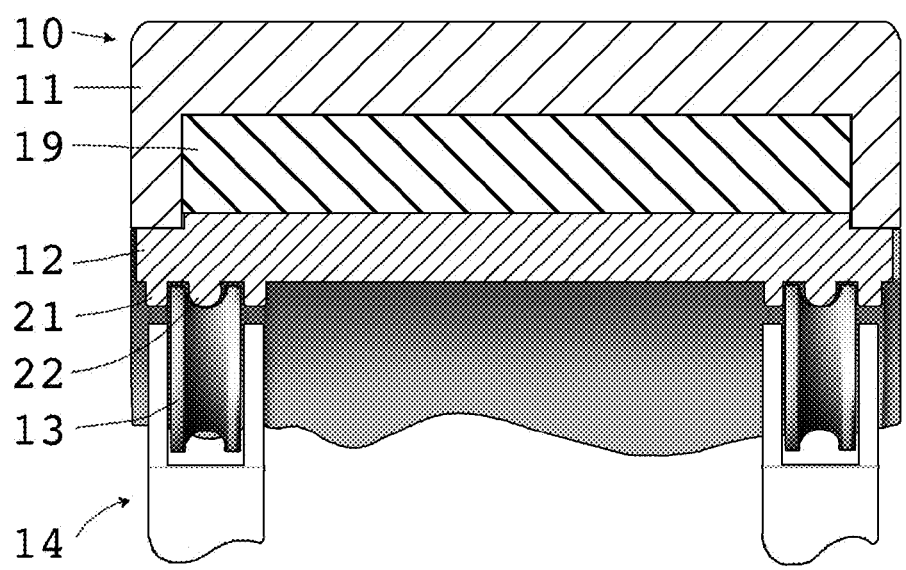
FIG. 6 shows a radial section of a simplistic embodiment of the tire (10) and rim (12) for vehicles with tires mounted in parallel.

FIG. 6 is a radial section view of an alternate embodiment of the invention displaying the outer tire layer (11), the softer lower layer (19), and part of the cylindrical rim (12) without a tunnel. It also displays the basic rail (22), rail guard (21), and roller (13) system used to rotate the wheel relative to part of the brace (14). This flat tire surface design is best suited for vehicles with parallel mounted tires.

Figure 7:
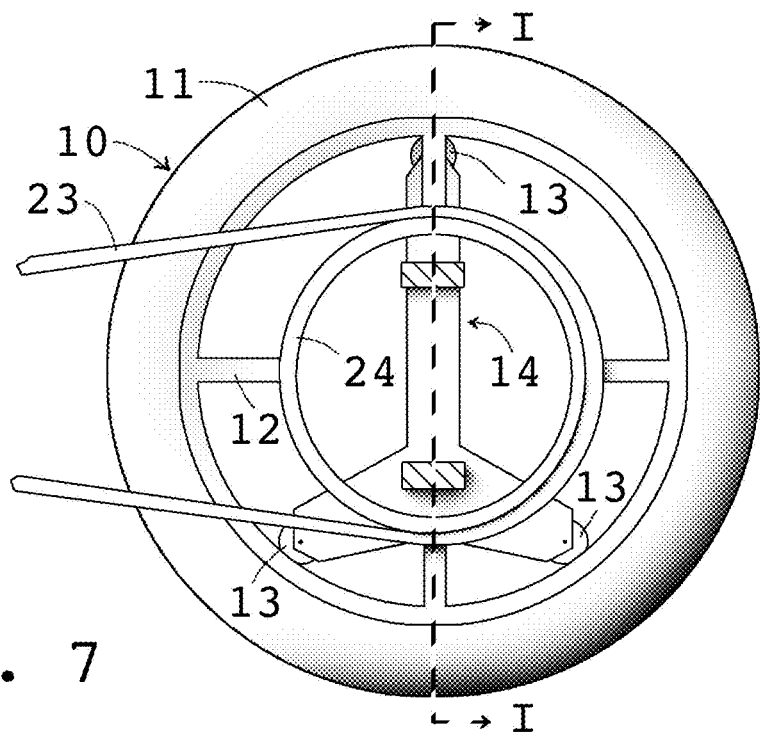
FIG. 7 is a side view of an alternative embodiment of the present invention including a modified rim (12) with drive spokes to a centered drive ring (24) and a drive belt (23).

FIG. 7 is a side view of a special alternative embodiment of the present invention. It presents the tire (10), the top layer (11), the brace (14), and a modified rim (12) in a configuration suited for a drive wheel. The modified rim (12) has spokes connected to a centered drive ring (24) which uses a drive belt (23) to apply rotational force to the wheel.

Figure 8:
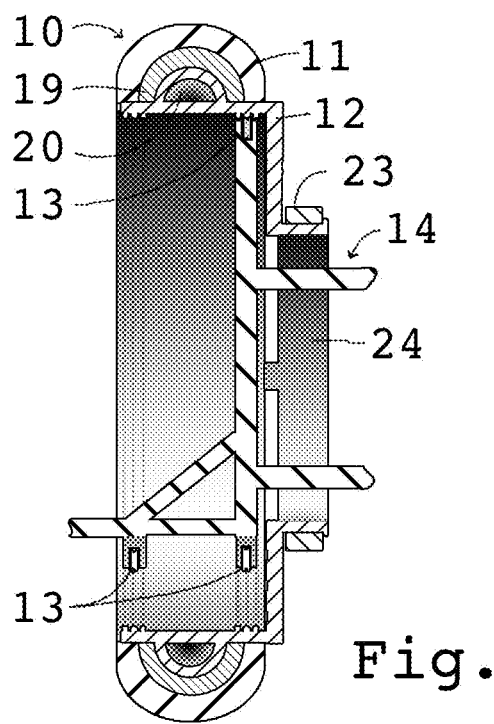
FIG. 8 is a cross sectional view along lines I-I of the alternative embodiment (FIG. 7) for the present invention cutting through everything but the rollers (13).

FIG. 8 is the cross-sectional view of FIG. 7 showing the tire (10), the upper rubber layers (11), the lower rubber layer (19), and the modified rim (12). The rim has a tunnel (20) under the rubber layers and a centered drive ring (24) holding a drive belt (23). A pulling force on the drive belt (23) causes the rim (12) and tire (10) to rotate over the modified center brace (14). This brace design (14) attaches to an arbitrary suspension system on both sides of the lower part of the wheel and therefore only needs to use five rollers to maintain stability.

The invention claimed is:

1. A hub-less vehicle wheel comprising a solid tire (10) without hollows therein, a rotatable hollow cylindrical rim (12) with an inner and outer surface, and a support structure or brace (14), wherein the solid tire (10) has a durable treaded outer rubber layer (11) that is designed for contact with a vehicle road and also for covering the circumferential surface and sides of a rubber inner layer (19); moreover, the inner and outer rubber layers are bonded to the outer surface of the rotatable hollow cylindrical rim (12), whereas the inner surface of the rotatable hollow cylindrical rim (12) is designed to interface with either bearings or rollers (13) mounted in the support structure or brace (14); and wherein the bearings or rollers (13) are geometrically positioned to form a plane truss and therefore constitute a rigid frame for the direct attachment of a vehicle suspension.

2. The wheel of claim 1 with the rotatable hollow cylindrical rim's (12) body containing a centered and truncated cylindrical cavity or tunnel (20) over which the tire layers (11 & 19) are bonded.

3. The wheel of claim 1, wherein the rotatable hollow cylindrical rim (12) has mountings or fittings for a vehicular braking mechanism (17).

4. The wheel of claim 2, wherein the rotatable hollow cylindrical rim (12) has mountings or fittings for a vehicular braking mechanism (17).

5. The wheel of claim 1, 2, 3, or 4 wherein the rotatable hollow cylindrical rim's (12) shoulder has mountings for spokes that radially emanate from a coaxially centered drive ring (24) with the outer surface of the drive ring (24) having teeth, and a groove in order to engage a chain, toothed belt, or v-belt.

* * * * *